May 14, 1935.  P. F. SHARPE  2,000,997
UNIVERSAL SHAFT CONNECTION
Filed April 13, 1932
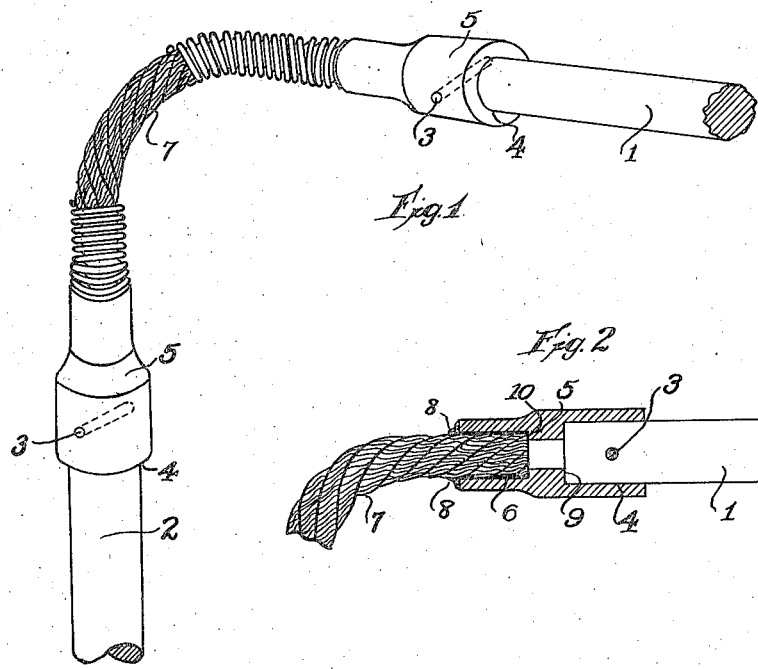
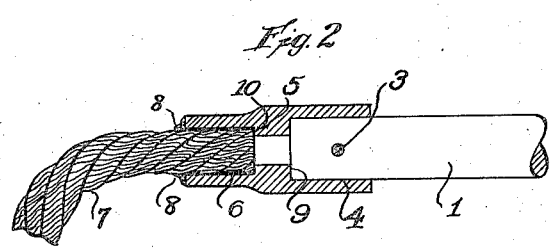
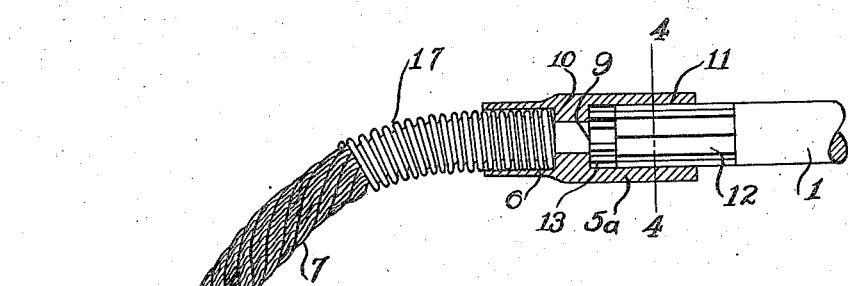
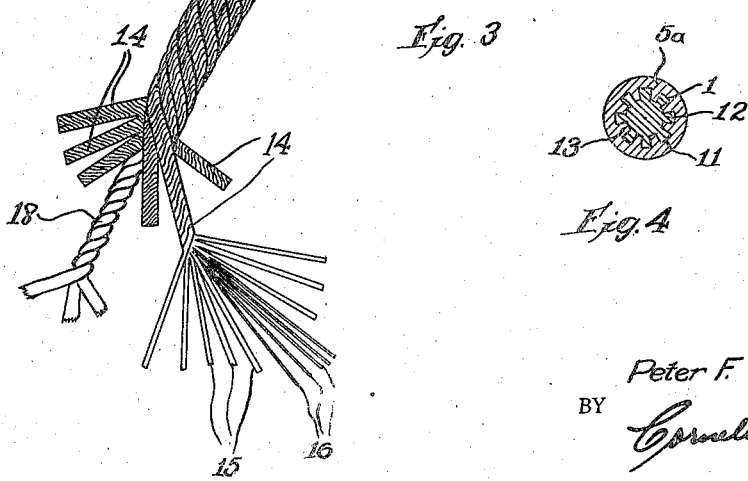
INVENTOR.
Peter F. Sharpe
BY
ATTORNEY.

Patented May 14, 1935

2,000,997

UNITED STATES PATENT OFFICE 2,000,997

UNIVERSAL SHAFT CONNECTION

Peter F. Sharpe, Atlantic City, N. J.

Application April 13, 1932, Serial No. 604,970

1 Claim. (Cl. 64—96)

This invention relates to universal connections between two shafts and is so constituted as to permit one shaft to be driven from the other irrespective of the angular relation between said shafts. In other words, when the connection of the present invention is associated with a driving and a driven shaft, said shafts may properly function when in alinement, as well as when in appreciable angular relation.

Speaking generally, the invention embodies the interposition between adjacent shaft ends of a relatively stiff though flexible cable of a character well able to withstand the greatest strains and to transmit appreciable power without any detrimental effects whatsoever.

So-called wire cables have been heretofore suggested for use more particularly in connection with flexible shafts for the operation of dental hand tools and other relatively light implements. These flexible shafts have invariably consisted in one or more resilient coils of wire simulating helical coil springs in relatively close coils. In some cases, a single coil has been used, while in other cases a plurality of coils producing a laminated structure have been employed, but in practically every instance the structure is light and while well adapted to transmit power to light instruments and where no great amount of power is required, these prior devices have proven entirely useless in the transmission of power of any appreciable degree.

Furthermore, when employing spring coil as an element in the transmission of power, great care must be taken in the handling of such structures in order not to deform or crimp the coils, because if a crimp occurs the shaft is ruined and is of no further utility.

With the foregoing facts in mind, the object of the present invention is to provide a universal shaft coupling embodying a flexible element in the form of a cable of such character that it is practically indestructible, and one which will transmit almost unlimited power without any fear of breakage and in a thoroughly efficient and satisfactory manner.

In order to produce a universal coupling of the character stated, I employ a cable preferably made up of a number of strands of wire which are twisted together about a core of fibre, such as hemp or the like and which fibre is impregnated with grease or some other appropriate lubricant, which will serve as a lubricant for the surrounding wire strands. Each strand is, in turn, formed of a plurality of wires which may be of the same or different sizes, so that the cable is made up of a large number of wires, all of which are preferably of resilient character, so that while the resilient cable is fairly stiff, its inherent resilient parts impart to the whole a rather stiff resilient character. Furthermore with a cable of this kind properly anchored to the adjacent ends of driving and driven shafts, great power can be transmitted with absolutely no harm whatsoever to the cable element. With relatively short length of cable, it is impossible for such a cable to kink and if the connection is to be of considerable length, kinking can be absolutely precluded by enclosing the cable within a metal sheath comprising a wire wrapping as hereinafter more fully described and forming a part of this invention.

Features of the invention, other than those adverted to, will be apparent from the hereinafter detailed description and claims when read in conjunction with the accompanying drawing.

The accompanying drawing illustrates different practical embodiments of the invention, but the constructions shown therein are to be understood as illustrative, only, and not as defining the limits of the invention.

Figure 1 is a perspective view of the universal shaft coupling embodying this invention, the shaft sections thereof being shown at right angles to one another.

Figure 2 shows in section the coupling between one end of the cable and corresponding shaft end.

Figure 3 is a view similar to Figure 2, but illustrating a modified form of coupling, and showing in greater detail the cable construction.

Figure 4 is a cross section on the line 4—4 of Figure 3.

Referring to the drawing, 1 and 2 identify two shaft sections, which may be disposed in various positions, either at right angles or otherwise. The adjacent ends of these shaft sections are secured by means of transverse pins or the like 3 in sockets 4 of the connectors or couplings 5.

The other end of each of the couplings is provided with a socket 6, into which an end of a cable section 7 is inserted and fastened in any suitable manner, preferably by electro-spot welding, brazing or the like as identified at 8. The two sockets 4 and 6 are shouldered at their bottoms as identified at 9 and 10, for the purpose of limiting the insertion of the shaft section and the end of the section of wire cable, that is prior to permanently connecting such parts. After the section of cable becomes worn, to the extent that it is incapable of transmitting positive power, the cable section can be removed, by rupturing the brazed or welded joint and a new section applied. It is possible also to remove the transverse pin 3 in order to detach the used cable section, and apply a new section with new couplings.

In Figures 3 and 4 there is a slight modified construction, wherein the coupling or connector 5a has its interior at one end provided with a series of ribs or elongated teeth 13 which interengage with similar teeth 12 on one end of a shaft 1. In other words as shown in Figure 4 the interior 11 of the coupling has radial teeth 13 interengaging with the teeth 12, so that the coupling 5a may have slight longitudinal movements as the two sections 1 and 2 of the shaft rotate. It is obvious that when using the construction in Figures 3 and 4, the other end of the flexible cable section terminates into a joint similar to that in Figure 1.

I call particular attention to Figure 3 of the drawing wherein the cable structure is shown with greater detail. Here the cable is shown as a twisted wire cable embodying six strands 14, each of which is, in turn, composed of a number of twisted strands 15 and 16. It is of course within the purview of this invention to use a greater or lesser number of strands, but in any event there should be a plurality of strands, so that when twisted together they will twist with a multiple pitch, three strands being desirable at all times. Furthermore, the several wires 15 and 16 of the respective strands may all be of the same size, but I find that better results are obtained if the wires 15 are made somewhat larger than the wires 16 and twisted about the latter wires which serve as a core. This arrangement produces a cable of the necessary flexibility while at the same time having the requisite stiffness to transmit great power with a cable of relatively smaller circumference.

When shafts are driven at considerable speed through the utilization of a cable connection as shown, the respective wires of the cable shift rapidly with respect to one another and are apt to generate some heat and be subjected to considerable wear. For this reason, I preferably provide the cable with a fibre core 18, such, for example, as hemp, cotton or the like and impregnate this core with grease or some other lubricant. The core is preferably made of a plurality of strands twisted together and when impregnated with the lubricant as stated, it serves to keep the cable parts lubricated at all times to minimize wear and preclude heating. In the structure of the cable, the strands are preferably twisted in one direction, while the wires comprising the individual strands are twisted in the opposite direction in order to obtain maximum strength and at the same time produce a structure which will not tend to unwind. The cable connection between shaft ends as specified will transmit power in both directions, but will transmit the greatest power when the rotation of the shaft is in a direction tending to wind the strands 14 more tightly. Rotation in this direction will transmit through the cable substantially as great if not more power than can be transmitted through the solid shafts themselves provided of course that the couplings between the cable and the shafts are sufficiently strong to withstand the transmission of such power.

Under ordinary conditions in most arts, the cable section may be made relatively short in which event there is not the slightest chance of possibility of kinking of the cable. If a long cable section, however, is necessary where kinking might possibly under some conditions occur, this can be effectually precluded by providing the cable with an envelope formed by a wrapping of resilient wire 17, as shown. This wire envelope is secured at its opposite ends to the couplings of the shafts, by yielding, pressing or in any other appropriate manner and forms a casing for the cable. It also forms a protective covering and may be used to advantage when short cable sections are used and where there is a possibility of the cable coming in contact with metal parts for in this environment the envelope will take the wear off the cable. Such envelope will moreover reinforce the cable section when power is transmitted in reverse for it will hold the strands of the cable against untwisting. It may be noted in this connection that the wire envelope 17 is preferably wound in a direction opposite from the twisted cable.

The foregoing detailed description sets forth the invention in its preferred, practical form, but I wish it understood that details of construction may be varied without departing from the invention and other forms of coupling may be employed between the cable ends and the shafts. The invention is to be understood as fully commensurate with the appended claims.

Having thus fully described the invention, what I claim as new and desire to secure by Letters Patent is:

A flexible connection for connecting a driven shaft to a driving shaft embodying a cable section provided at one end with a coupling for rigidly securing that end of the cable to one of the shafts, a coupling at the other end of the cable for securing the latter end of the cable to the other shaft, said cable section comprising a fibre core extending longitudinally of the cable and formed from a plurality of closely twisted strands of fibre impregnated with a lubricant, a plurality of strands of wire all tightly twisted in the same direction around said fibre core, each of said strands comprising a wire core consisting of a bunch of strands of wire of relatively small diameter and all of circular cross section, and a plurality of wires all of circular cross section and all of a larger diameter and all tightly wrapped in the same direction with respect to one another about said wire core and in a direction opposite to the twist of the wire strands, and an envelope of resilient wire closely and tightly coiled about the cable section in a helical direction opposite to the direction of twist of the wire strands and securely anchored at its opposite ends to the respective couplings to reinforce the cable section and tighten about the same when the shafts are rotated in a retrograde direction to preclude untwisting of the cable section.

PETER F. SHARPE.